United States Patent
Blackwell et al.

(10) Patent No.: US 6,631,178 B1
(45) Date of Patent: Oct. 7, 2003

(54) SYSTEM AND METHOD FOR TRANSMITTING DATA OVER LOADED AND UNLOADED TWISTED PAIRS

(75) Inventors: Steven R. Blackwell, Huntsville, AL (US); Richard L. Goodson, Huntsville, AL (US); Jason N. Morgan, Madison, AL (US); Ayman Ghobrial, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 170 days.

(21) Appl. No.: 09/760,106

(22) Filed: Jan. 12, 2001

(51) Int. Cl.$^7$ .............. H04M 1/24; H04M 3/08; H04M 3/22
(52) U.S. Cl. ............. 379/1.04; 379/24; 379/27.01; 379/28; 375/219; 375/224; 375/295
(58) Field of Search .............. 379/1.04, 1.03, 379/22, 22.02, 22.04, 22.07, 24, 27.01, 27.03, 29.01, 31, 28; 375/224, 219, 222, 295, 345

(56) References Cited

U.S. PATENT DOCUMENTS

| | | | | |
|---|---|---|---|---|
| 5,881,130 A | * | 3/1999 | Zhang | ............ 379/6 |
| 6,061,427 A | * | 5/2000 | Ryoo | ............ 379/1 |
| 6,181,791 B1 | * | 1/2001 | Murphy | ............ 379/390 |
| 6,212,229 B1 | * | 4/2001 | Salinger | ............ 375/224 |
| 6,256,377 B1 | * | 7/2001 | Murphree et al. | ............ 379/24 |
| 6,266,395 B1 | * | 7/2001 | Liu et al. | ............ 379/27 |
| 6,532,277 B2 | * | 3/2003 | Ulanskas et al. | ............ 379/27.01 |
| 6,539,081 B2 | * | 3/2003 | Zakrewski et al. | ............ 379/93.32 |
| 2002/0067802 A1 | * | 6/2002 | Smith et al. | ............ 379/1.04 |
| 2003/0021388 A1 | * | 1/2003 | Starr et al. | ............ 379/1.04 |

* cited by examiner

*Primary Examiner*—Binh Tieu
(74) *Attorney, Agent, or Firm*—Waddey & Patterson; Larry W. Brantley (57) ABSTRACT

A system and method for transmitting data over a twisted pair with or without load coils using a transmitter and receiver is disclosed. The system detects load coils by generating and transmitting a test signal having signal power concentrated in two different frequency bands across the twisted pair and comparing the signal power of the received signal to determine whether the twisted pair is loaded or unloaded. If load coils are detected, an adjustment circuit is used to configure the receiver for reception of data over a twisted pair having load coils. Otherwise, the adjustment circuit configures the receiver for reception of data over a twisted pair without load coils.

20 Claims, 7 Drawing Sheets

SYSTEM AND METHOD FOR TRANSMITTING DATA OVER LOADED AND UNLOADED TWISTED PAIRS

BACKGROUND OF THE INVENTION

The present invention relates generally to high-speed data communications over conventional telephone lines with or without load coils. More particularly, this invention pertains to a system and method built into a high-speed digital communication transceiver pair for detecting the presence and absence of load coils on a telephone line and adapting each transceiver based on the presence or absence of load coils. The adaptation of each transceiver provides for improved data transmission reliability over both loaded and unloaded lines.

Telephone companies and other providers of communications services have sought in recent years to develop improved hardware and techniques for using existing conventional copper telephone lines, such as twisted pairs, to transmit and receive digital data. One of the services offered by telephone companies is digital data services (DDS) at up to 64 Kbps over four wire unloaded twisted pairs.

One of the disadvantages of transferring data over conventional telephone lines, i.e., over twisted wire pairs, is dealing with a variety of line impairments, including hardware added to the twisted wire pairs that was intended to be used for analog voice services. For example, telephone companies have conventionally attached load coils at periodic intervals along the twisted pairs connecting the central office to the customer premises. The load coils reduce attenuation across the voice frequency band thereby maintaining voice quality over a range of line lengths.

Unfortunately, the load coils also cause a substantial roll-off or attenuation of the frequency response of the twisted pair above 3500 Hz. The roll-off limits the frequency bandwidth available for data transfer using the twisted pair. This can cause significant problems if the twisted pair is used for DDS because the frequency bandwidth necessary for DDS is greater than 3500 Hz.

As a result, service providers must first determine if load coils are present before they can use prior art transceivers with a given twisted pair. If load coils are present they must be removed in order to deploy DDS. Information regarding the presence or absence of load coils on a given twisted pair, however, is not always readily available.

What is needed, then, is a system and method that may be incorporated into a high-speed digital transceiver pair for detecting and compensating for load coils in a twisted pair.

SUMMARY OF THE INVENTION

The present invention provides a system and method that is incorporated into a high-speed digital communications transceiver pair and is operable to determine whether or not load coils are connected to a twisted pair. In addition, the system and method automatically adjust the transceiver pair to compensate for the presence or absence of load coils on the twisted pair. The present invention determines whether or not load coils are connected to a twisted pair by transmitting a test signal, which has signal power (i.e., frequency components) concentrated in the voice frequency band and signal power (i.e., frequency components) concentrated outside of the voice frequency band, over the twisted pair. The voice frequency band is defined within the present invention as the band of frequencies ranging from approximately 300 Hz to 3300 Hz. The signal power concentrated in each band is not critical so long as it is possible to distinguish the signal power in one band from the signal power in the other band.

When load coils are connected to the twisted pair, the load coils reduce the attenuation of frequency components inside the voice frequency band, while at the same time, significantly increasing the attenuation of frequency components outside of the voice frequency band as compared to unloaded loops.

By measuring the signal power that passes through the twisted pair it is possible to determine whether or not load coils are connected to the twisted pair. For example, if a signal having frequency components concentrated inside and outside the voice frequency band is transmitted over a twisted pair, and the signal received on the an other side of the twisted pair has frequency components concentrated outside of the voice frequency band that have been significantly attenuated by the transmission through the twisted pair relative to the frequency components concentrated inside the voice frequency band, load coils are connected to the twisted pair. Otherwise, load coils are not present.

In one embodiment, the present invention determines whether or not load coils are connected to a twisted pair by calculating the ratio of the power of the received signal outside of the voice frequency band and the power of the received signal inside the voice frequency band and comparing this ratio to a predetermined constant. If the ratio of powers is greater than the predetermined constant, then load coils are not connected to the twisted pair. If the ratio is less than the predetermined constant, then load coils are connected to the twisted pair.

Once the present invention determines whether or not load coils are connected to the twisted pair, an adjustment circuit is used to adjust the transceiver parameters accordingly. To put it another way, if load coils are detected, the adjustment circuit causes the transceiver to use one set of transceiver circuits and parameters and, if load coils are not detected, the adjustment circuit causes the transceiver to use another set of transceiver circuits and parameters.

In one embodiment, the present invention includes a transmitter connected to a receiver using a twisted pair. The transmitter includes a signal generating circuit that is operable to generate and transmit a test signal that contains a first signal at a first frequency and a second signal at a second frequency. The first signal has a frequency that is higher than the highest frequency in the voice frequency band and the second signal has a frequency that falls within the voice frequency band. In other words, the signal power of the test signal is concentrated inside and outside of the voice frequency band. In one embodiment, the first signal has a frequency of 4 kHz and the second signal has a frequency of 1.5 kHz.

The receiver includes a load coil detection circuit that is operable to receive and filter the test signal, which is modified by transmission across the twisted pair, to separate out the first and second signals. The load coil detection circuit further includes a signal power measurement circuit for measuring the signal power of the first and second signals and a comparator circuit for comparing the measured power of the first signal with a scaled measured power of the second signal. If load coils are present, then the first signal will be more attenuated than it would be if load coils were not present. In a similar manner, the second signal will be less attenuated if load coils are present.

Finally, the receiver includes an adjustment circuit that is used to adjust the receiver based on the presence or absence of load coils on the twisted pair.

In an alternative embodiment, the present invention is incorporated into a pair of transceivers. In this alternative embodiment, the present invention simply uses a transmitter located in the first transceiver and a receiver located in the second transceiver to determine if load coils are present on the twisted pair. Once this determination is made, the adjustment circuit in the second transceiver is used to adjust the receiver in the second transceiver accordingly. In addition, this information is sent to the first transceiver and the first transceiver is adjusted accordingly.

In another alternative embodiment, the present invention uses the transmitter located in the first transceiver and the receiver located in the second transceiver to determine if load coils are present on the twisted pair. In addition, in this embodiment the present invention also uses the transmitter located in the second transceiver and the receiver located in the first transceiver to determine if load coils are connected to the twisted pair. In this case, the adjustment circuits in both the first and second transceivers are used to adjust the transmitters and receivers in each transceiver accordingly.

DESCRIPTION OF THE PREFERRED EMBODIMENTS

As an initial note, the present invention is preferably integral to a high-speed data communication transceiver pair such as the system described in detail in Applicant's co-pending U.S. patent application Ser. No. 09/668,856 filed on Sep. 25, 2000 and entitled "A Method and Apparatus for Duplex Transmission on a Four Wire Communication System." Accordingly, the disclosure of that application is hereby incorporated by reference in its entirety into this application.

Figure 1:
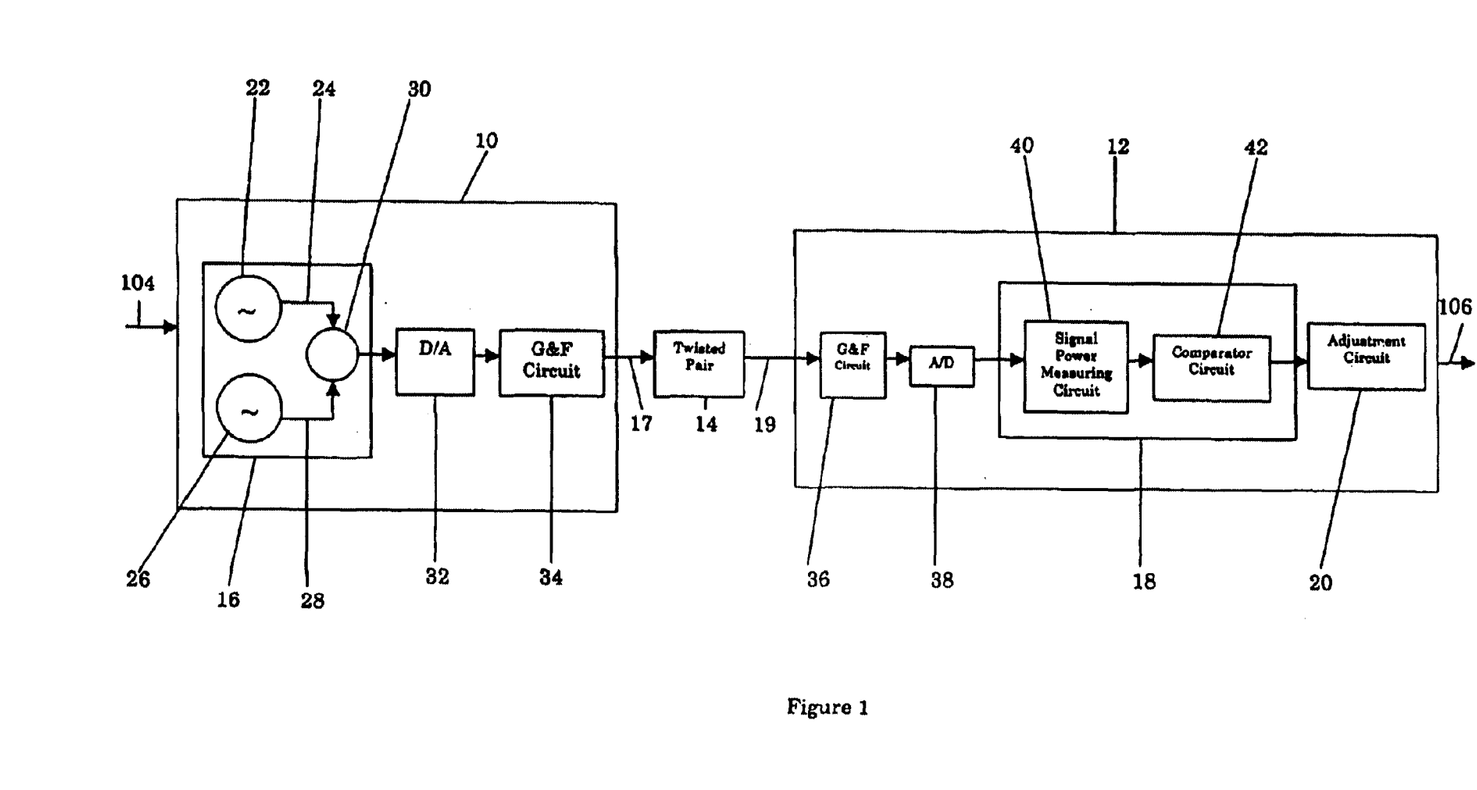
FIG. 1 is a block diagram of one embodiment of the present invention.

A block diagram of one embodiment of the present invention is shown in FIG. 1. This embodiment includes a transmitter 10 connected to a receiver 12 using a twisted pair 14, which may or may not be connected to load coils (not shown). Transmitter 10 includes a test signal generating circuit 16 that is operable to generate and transmit a test signal 17 over the twisted pair 14 to the receiver 12. The receiver 12 includes a load coil detection circuit 18 for detecting the presence or absence of load coils on the twisted pair 14 and an adjustment circuit 20 for adjusting parameters in the receiver 12 to compensate for the presence or absence of load coils.

Test signal generating circuit 16 includes a first signal generator 22 for m generating a first signal 24 having a first frequency, f1, which results in a signal having a signal power concentrated outside of the voice frequency band. In one embodiment, the first frequency is 4000 Hz. In alternative embodiments, other frequencies may be used as long as those frequencies are higher than the highest frequency in the voice frequency band or, in other words, the first signal has a frequency that results in a signal power concentrated outside of the voice frequency band. For example, the first signal might include a series of pulses, a single pulse, a square wave, or multiple sine waves.

Test signal generating circuit 16 also includes a second signal generator 26 for generating a second signal 28 having a second frequency, f2, which results in a signal having a signal power concentrated inside of the voice frequency band. In one embodiment, the second frequency is 1500 Hz. Alternative embodiments may include a second frequency chosen from any frequency within the voice frequency band so long as the resulting signal includes a signal power concentrated in the voice frequency band. In a manner similar to that discussed with regard to the first signal, the second signal might also include a series of pulses, a single pulse, a square wave, or multiple sine waves.

A signal combiner (or summing circuit) 30 is included in the test signal generating circuit 16 for combining the first and second signals, 24 and 28, to form the test signal 17. In one embodiment, the signal combiner 30 is a summer and simply sums the two signals together to create the test signal 17.

In one embodiment, the test signal generating circuit 16 is implemented using a Digital Signal Processor circuit (not shown). A variety of other conventional signal generating devices and circuits may be used to generate these signals as well. In this embodiment, the test signal 17 is generated in a digital form and must be converted into an analog signal. As a result, the transmitter 10 includes a digital-to-analog (D/A) converter circuit 32 for converting the digital version of test signal 17 into an analog version. In addition, the transmitter 10 in this embodiment also includes a gain and filtering circuit 34 for boosting the signal strength of the resulting analog signal prior to transmission across the twisted pair 14. Those skilled in the art are aware of how to use DSPs, D/A circuits, and gain and filtering circuits to perform signal generation, combining, filtering, as well as other processes, in the transmitter 10.

Referring again to FIG. 1, the test signal 17 is transmitted across twisted pair 14 to form a received test signal 19. The received test signal 19, which is essentially the test signal 17 as modified by the transmission characteristics of the twisted pair 14, is then applied to the input of receiver 12.

Receiver 12 includes a gain and filtering circuit 36 and an analog-to-digital (A/D) circuit 38. The gain and filtering circuit 36 is operable to boost the signal strength of the received test signal 19 and the A/D circuit 28 is operable to convert the received test signal 19 into a digital signal. Gain and filtering circuit 36 and A/D circuit 38 are required when the processing of the received test signal 19 is to be performed using a DSP circuit, but would not be necessary if the signal processing is performed using analog circuits.

As mentioned previously, receiver 12 includes a load coil detection circuit 18 and an adjustment circuit 20. In a preferred embodiment, the load coil detection circuit 18 and the adjustment circuit 20 are implemented using a Digital Signal Processor (DSP) circuit (not shown). However, these circuits could be implemented using other conventional circuits as well, such as Fast Fourier Transforms (FFTs), Discrete Fourier Transforms (DFTs), wavelet transforms, and others known to those skilled in the art.

Figure 2:
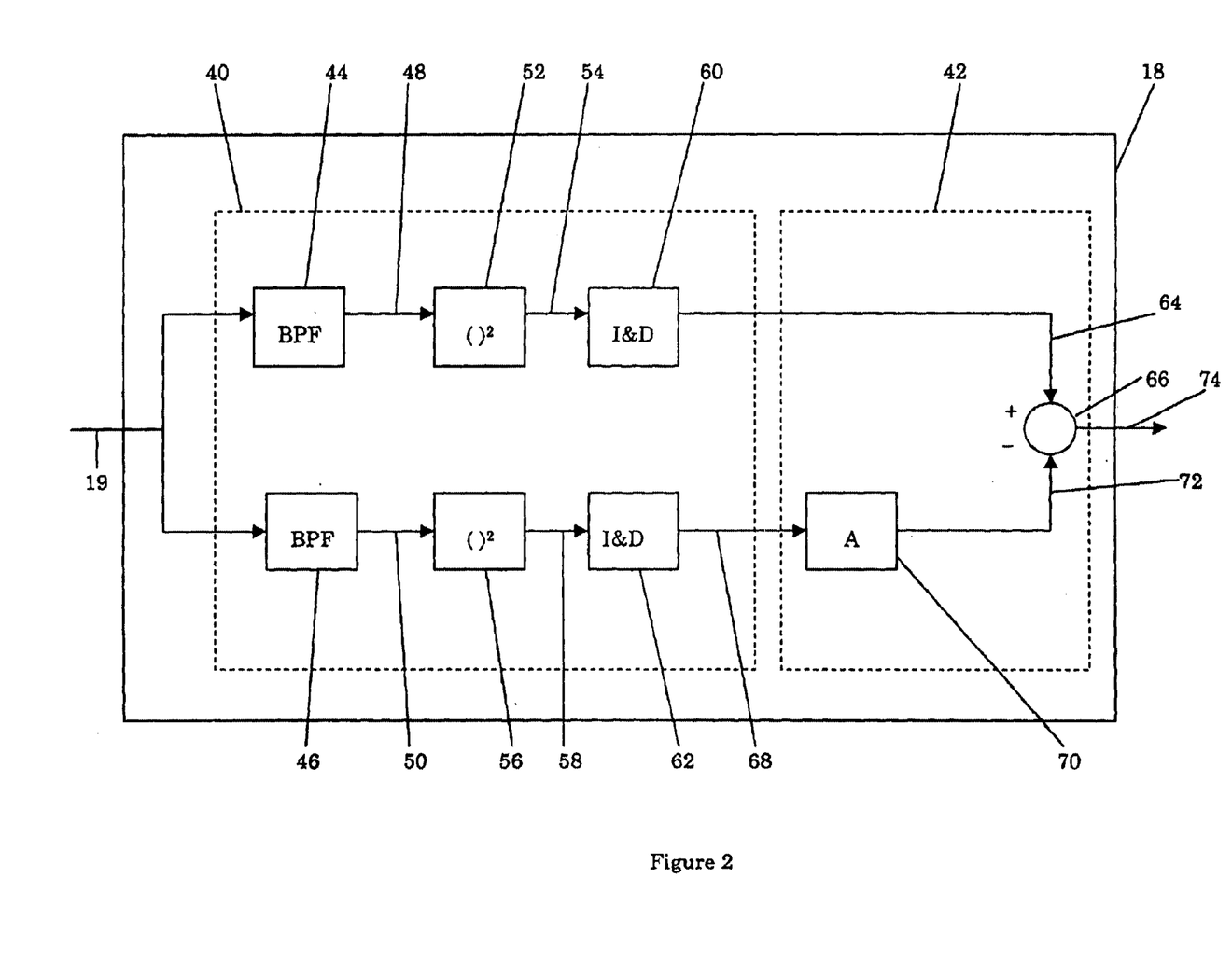
FIG. 2 is a block diagram of one embodiment of the load coil detection circuit of the present invention.

Referring to FIGS. 1 and 2, load coil detection circuit 18 in receiver 12 includes a signal power measuring circuit 40 connected to a comparator circuit 42. Signal power measuring circuit 40 includes a pair of filters, 44 and 46, for filtering the received test signal 19. Filter 44 is a bandpass filter centered around f1 allowing the first frequency f1 to pass while substantially rejecting f2, while filter 46 is a bandpass filter centered around f2 allowing the second frequency f2 to pass while substantially rejecting f1.

Filter 44 filters the received test signal 19 to obtain a first filtered signal 48 and filter 46 filters the received test signal 19 to obtain a second filtered signal 50. Preferably, the filters and other circuits contained in the receiver 12 are implemented using conventional digital techniques in a manner known to those of skill in the art.

First filtered signal 48 is essentially a version of the first signal 24 as modified by the transmission characteristics of the twisted pair 14. In other words, filtered signal 48 has the same frequency as the first signal 24, but has an amplitude that has been attenuated by the twisted pair 14. When the twisted pair 14 includes load coils the attenuation of the amplitude of the first signal 24 is greater as compared to the attenuation that occurs when the twisted pair 14 does not contain load coils.

In a similar manner, second filtered signal 50 is a modified version of second signal 28. In this case, however, the attenuation of the amplitude of the second signal 28 is less when load coils are present as compared to the attenuation that occurs when load coils are absent from the twisted pair 14.

In one embodiment, filter 44 is a band pass filter having a center frequency of f1 and filter 46 is a band pass filter having a center frequency of f2. In alternative embodiments, other filters may be used as long as the filters are designed to provide the above described filter characteristics such that there is no significant frequency overlap in the bandpass areas of the filters.

Signal power measuring circuit 40 also includes a first squaring circuit 52 for squaring the first filtered signal 48 (the resulting signal is referred to as the first squared signal 54) and a second squaring circuit 56 for squaring the second filtered signal 50 (similarly, the resulting signal is referred to as the second squared signal 58).

First squaring circuit 54 is connected in turn to a first integrate and dump circuit 60 and second squaring circuit 56 is connected to a second integrate and dump circuit 62. Both integrate and dump circuits are designed to integrate a predetermined number of samples, N, of any signal on their inputs. In one embodiment, N is thirty (30), however, more or less samples may be used as well.

One benefit of integrating, or alternatively accumulating, a predetermined number of samples is to reduce the effect of noise. In any event, the outputs of the integrate and dump circuits are considered to be equivalent to the signal power of each filtered signal.

Accordingly, first integrate and dump circuit 60 integrates first squared signal 54 to obtain a first integrated signal 64 (also referred to as a first signal power 64), which is coupled to the positive input of a summer 66, which forms part of the comparator circuit 42. Similarly, second integrate and dump circuit 62 integrates second squared signal 58 to obtain a second integrated signal 68 (also referred to as a second signal power 68), which is coupled to the negative input of the summer 66 through a scaling circuit 70, which is also a part of comparator circuit 42.

Scaling circuit 70 multiplies the second integrated signal 68 by a constant number (or scaling factor), A, in order to generate a scaled signal 72. The scaling factor is selected such that the output of the summer 66 is positive for unloaded twisted pairs and negative for loaded twisted pairs. In one embodiment, A is 1/64. In alternative embodiments, the scaling factor may vary.

Figure 3:
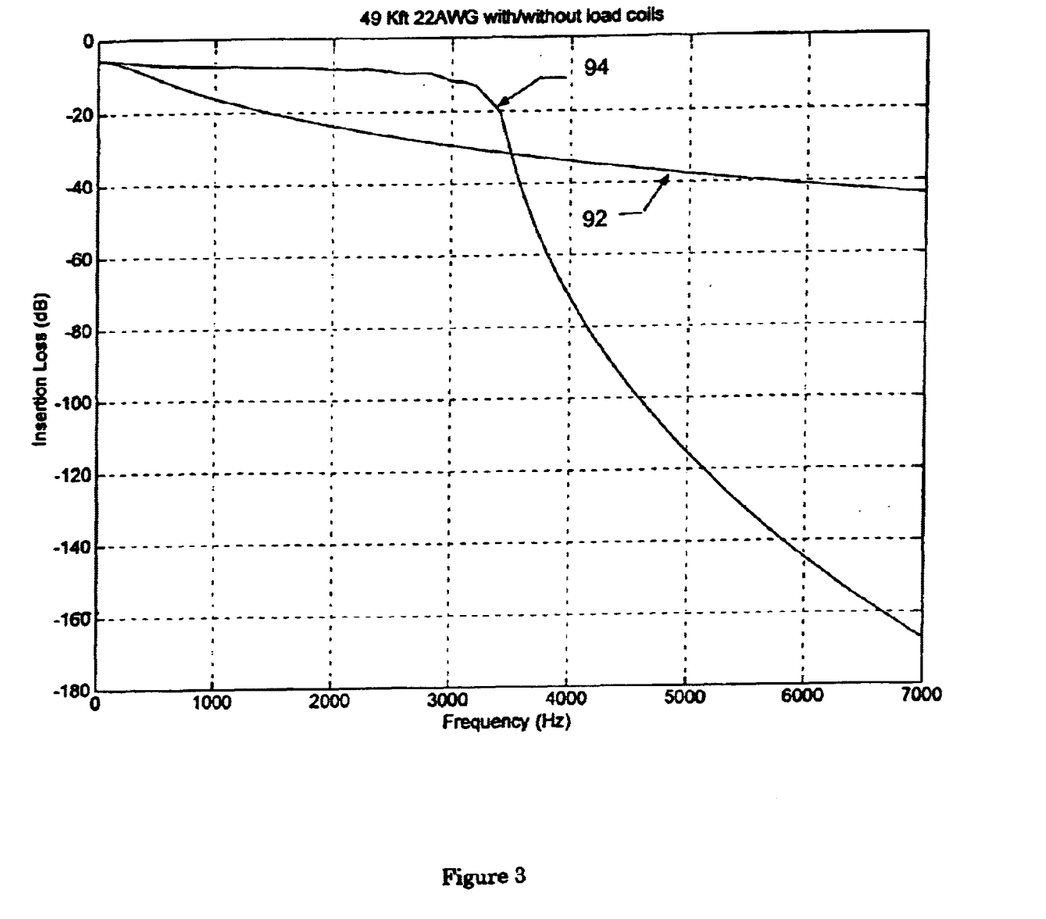
FIG. 3 is a plot of insertion loss versus frequency for a loaded and unloaded twisted pair.

To illustrate, consider FIG. 3, which shows a plot of insertion loss (caused by the twisted pair 14) with respect to frequency. Line 92 is a plot of the losses caused by twisted pair 14 as the frequency transmitted over the twisted pair 14 varies from 0 to 7000 Hz. Line 94 is a similar plot of the losses when load coils are connected to the twisted pair 14.

Referring to line 92, the attenuation at a frequency of 1500 Hz caused by the twisted pair 14 is approximately 20 dB, while at a frequency of 4000 Hz the attenuation is approximately 34 dB. Multiplying the second integrated signal 68 by scaling factor A reduces the second integrated signal 68 enabling a direct comparison of the two signals. As the result, scaled signal 72 is less than the first integrated signal 64 and when the first integrated signal 64 is summed with the scaled signal 72, the resulting difference signal 74 obtained at the output of summer 66 is a positive value.

Referring to line 94, the amount of attenuation at 1500 Hz caused by the twisted pair 14 with load coils (or more generally the loaded twisted pair) is approximately 7 dB. The amount of attenuation at 4000 Hz is approximately 71 dB. Thus, the difference in attenuation is much more pronounced than in the case where the twisted pair 14 was unloaded, i.e., with no load coils.

In this case, the scaled signal 72 will be larger than the first integrated signal 64, which will be very small relative to the scaled signal 72. As a result, the difference signal 74 will be less than zero, i.e., a negative value. Thus, the present invention determines whether load coils are present by determining whether the difference signal 90 is a positive value or a negative value.

Note that the polarity of the summer inputs could be reversed and the difference signal 74 could swing positive when load coils are present on the twisted pair 14 and the present invention contemplates this variation as well.

The above described comparator circuit may be expressed mathematically as P1-AP2, where P1 is the first signal power 64, A is the scaling factor, and P2 is the second signal power 68. When P1-AP2>0 load coils are not connected to the twisted pair. In a similar manner, when P1-AP2<0 load coils are connected to the twisted pair. This mathematical expression may also be rearranged to form the equivalent mathematical expression P1/P2>A and the present invention contemplates implementing the comparator circuit using this type of expression as well.

Figure 4:
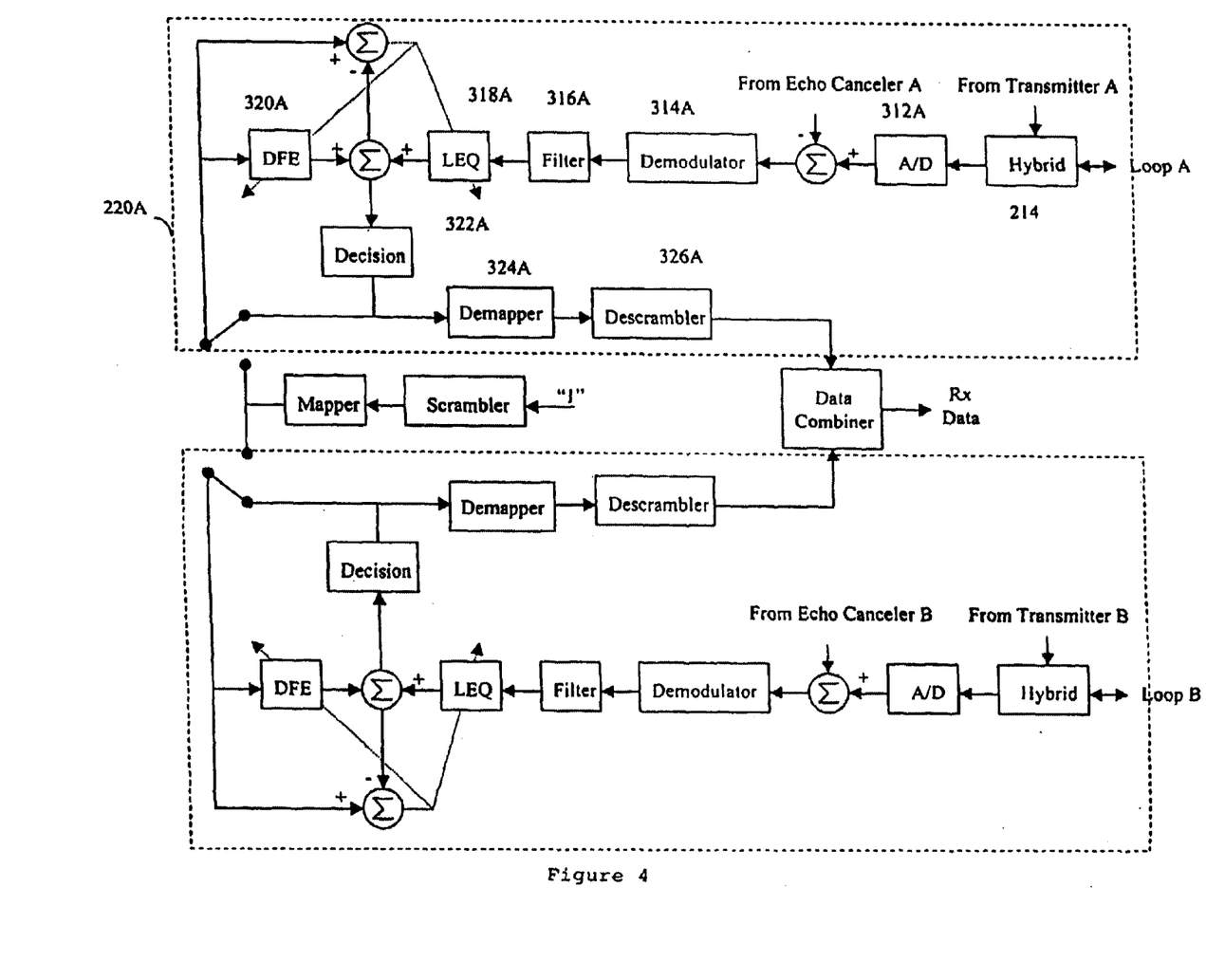
FIG. 4 is a block diagram showing receiver parameters that are adjusted based on the presence or absence of load coils.

Regardless of which alternative is used, once the present invention determines that load coils are or are not present, the receiver parameters are modified accordingly using the adjustment circuit 20 in the receiver 12. If load coils are present, then, in a preferred embodiment, the following circuits or parameters are selected in the receiver 12: a loaded hybrid circuit, loaded coefficients for LEQ initial coefficients, loaded LEQ gains, loaded DFE gains, loaded timing loop gains, and loaded timing loop training lengths. In a similar manner, if the twisted pair 14 is unloaded, then an unloaded version of each of these parameters is selected. These circuits and parameters are shown generally in FIG. 4. Additional information regarding how these circuits and parameters operate together may be found in the patent application entitled "A Method and Apparatus for Duplex Transmission on a Four Wire Communication System" and referred to earlier in this application.

In brief, the LEQ initial coefficients are loaded into the LEQ filter at the start of a data training stage. The LEQ and DFE gains control the speed of the adaptation of the LEQ and DFE, respectively. Timing loop gains determine the acquisition and tracking of the timing loop and timing loop training lengths determine the amount of time spent in the acquisition and training of timing.

The details regarding the selection of the appropriate circuits and parameters to be used for loaded and unloaded twisted pairs is known in the art and will not be discussed in detail here since this information is not deemed critical to an understanding of the present invention.

Figure 5:
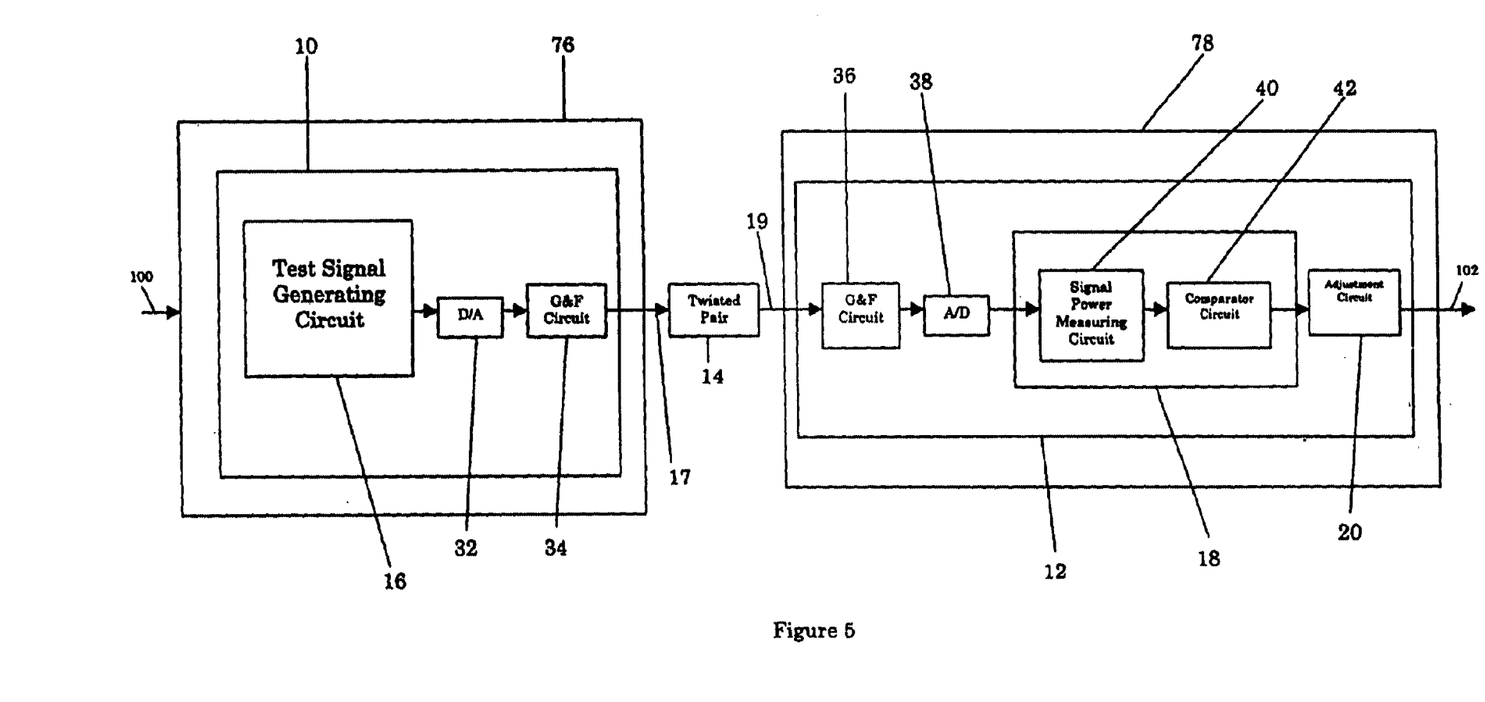
FIG. 5 is a block diagram of a second embodiment of the present invention.

The foregoing description of the transmitter 10 and the receiver 12 of the present invention may be implemented in several different embodiments. For example, FIG. 1 shows the implementation of the present invention using a single transmitter 10 and a single receiver 12. FIG. 5, on the other hand, shows the present invention implemented using a pair of transceivers, 76 and 78. In this embodiment, the present invention contemplates using the transmitter 10 of FIG. 1 located in the first transceiver 76 and the receiver 12 of FIGS. 1 and 2 located in the second transceiver 78. Furthermore, in this embodiment, the receiver 12 generates and transmits a signal containing information regarding the presence or absence of load coils on the twisted pair to the first transceiver 76 and an adjustment circuit (not shown) in the first transceiver 76 adjusts the first transceiver 76 accordingly.

Figure 6:
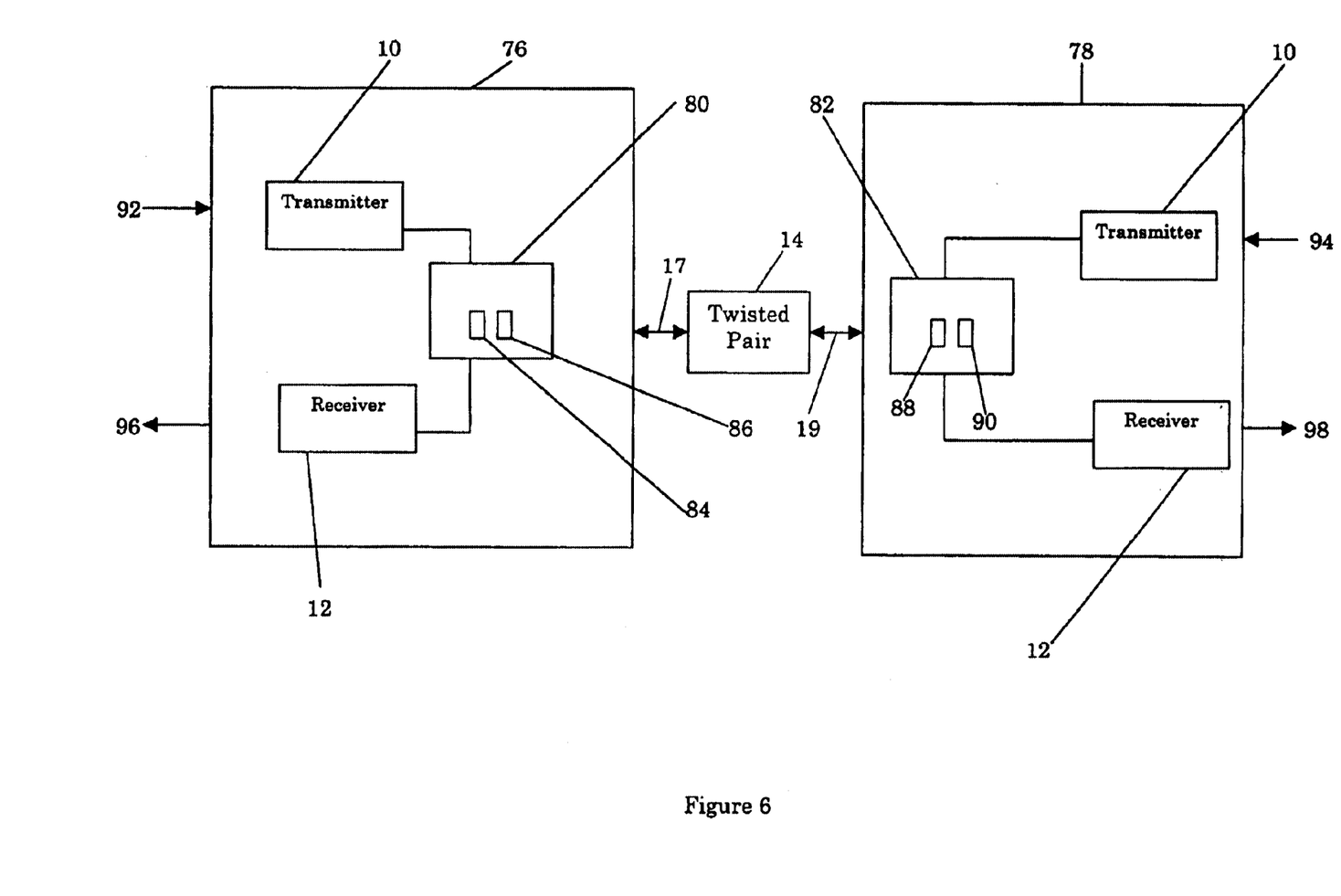
FIG. 6 is a block diagram of a third embodiment of the present invention.

Finally, FIG. 6 also shows the present invention implemented using a pair of transceivers, each transceiver having a transmitter 10 and a receiver 12 as described previously with respect to FIGS. 1 and 2. In this embodiment, the present invention contemplates sending a test signal 17 from the transmitter 10 in the first transceiver 76 to the receiver 12 in the second transceiver 78 and sending a test signal 17 from the transmitter 10 in the second transceiver 78 to the receiver 12 in the first transceiver 76. Note in this embodiment there are also two additional components, hybrid circuits, 80 and 82.

Hybrid circuits 80 and 82 attempt to generate a replica of the transmit echo or reflection caused by the mismatch between the transmit impedance and the loop. The replica is subtracted from the received signal, thereby reducing the transmit echo or reflection level in the receive signal. The function performed by the hybrid circuits 80 and 82 is similar to the function performed by analog echo canceller circuits, which are known in the art.

Hybrid circuit 80 includes an unloaded hybrid circuit 84 and a loaded hybrid circuit 86. In a similar manner, hybrid circuit 82 includes an unloaded hybrid circuit 88 and a loaded hybrid circuit 90. If the present invention determines that load coils are present on the twisted pair 14, then the adjustment circuit 20 (not shown in FIG. 6, but see FIG. 1) in the first transceiver 76 causes the loaded hybrid circuit 86 to be selected. If, on the other hand, load coils are not present, the adjustment circuit 20 in the first transceiver 76 causes the unloaded hybrid circuit 84 to be selected. A similar type of selection occurs with respect to unloaded hybrid circuit 88 and loaded hybrid circuit 90 in transceiver 78.

Transceivers, 76 and 78, also include data inputs, 92 and 94, and data outputs, 96 and 98, for inputting and outputting data from the transceivers. Similarly, in FIG. 5, transceiver 76 includes a data input 100 and transceiver 78 includes a data output 102 for inputting and outputting data, respectively. Finally, with respect to FIG. 1, transmitter 10 and receiver 12 include data input 104 and data output 106, respectively. Inputting and outputting data using transmitters, receivers, and transceivers is well known to those skilled in the art and will not be discussed in further detail.

The present invention contemplates using an arrangement of the type shown in FIG. 6 between a telephone company's central office and the telephone company's customer's premises or between two of the telephone company's central offices. Other connection arrangements are also possible as well.

It is also contemplated that the present invention will be used in conjunction with pre-training, training, and data transmitting modes. These modes are described in detail in the patent application entitled "A Method and Apparatus for Duplex Transmission on a Four Wire Communication System" and referenced above.

Figure 7:
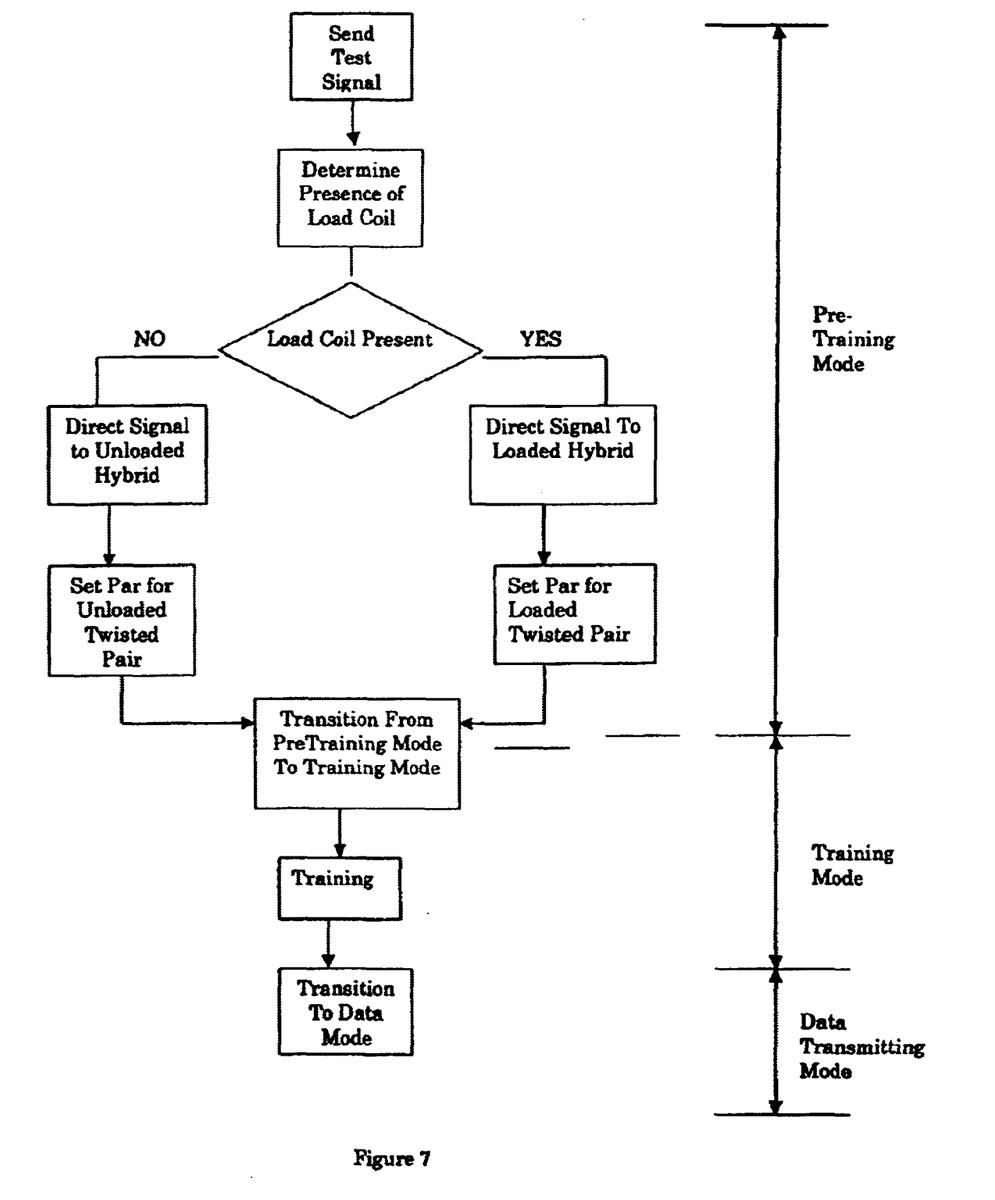
FIG. 7 is a flow chart showing the pre-training, training, and data transmitting modes of the present invention.

Referring to FIG. 7, a flow chart showing the pre-training, training, and data transmitting modes contemplated by the present invention is shown. In the pre-training mode, the transmitter 10 in transceiver 76 (see FIG. 6) generates and transmits a test signal 17 across the twisted pair 14.

Receiver 12 in the second transceiver 78 receives the transmitted test signal (also referred to as received test signal 19) and determines if load coils are present on the twisted pair 14. If load coils are present, then the adjustment circuit 20 in the second transceiver 78 selects the loaded hybrid circuit 90 and sets receiver parameters in receiver 10 of the second transceiver 78 to the receiver parameters used to transmit data over a loaded twisted pair (also referred to simply as the loaded receiver parameters). If load coils are not present, then the adjustment circuit 20 in the second transceiver 78 selects the unloaded hybrid circuit 88 and the unloaded receiver parameters.

Next, the present invention transitions from the pre-training mode to the training mode, which is described in detail in the earlier referenced patent application entitled "A Method and Apparatus for Duplex Transmission on a Four Wire Communication System." Once the training mode is completed then the present invention transitions from the training mode to the data transmitting mode, which is also described in detail in the earlier referenced patent application entitled "A Method and Apparatus for Duplex Transmission on a Four Wire Communication System."

The system and method of the present invention will automatically begin operating and sensing the presence or absence of a load coil when a transceiver such as that described above is first powered up. Furthermore, it will be apparent to those of skill in the art that the system and method of this invention may be implemented in software and will preferably be integrated into existing digital signal processing (DSP) devices in the transceiver.

Thus, although there have been described particular embodiments of the present invention of a new and useful "System And Method For Transmitting Data Over Loaded and Unloaded Twisted Pairs," it is not intended that such references be construed as limitations upon the scope of this invention except as set forth in the following claims.

The invention claimed is:

1. A method of using a receiver to receive data over a twisted pair with or without load coils, comprising the steps of:

receiving test signal transmitted by a transmitter connected to the receiver using the twisted pair;

determining the presence or absence of load coils on the twisted pair based on the test signal using a load coil detection circuit in the receiver by measuring signal power of the received test signal in a first predetermined frequency band; measuring signal power of the received test signal in a second predetermined frequency band; and comparing the measured signal powers to determine the presence or absence of load coils;

adjusting the receiver to compensate for the presence or absence of load coils on the twisted pair using an adjustment circuit in the receiver; and receiving data transmitted by the transmitter over the twisted pair.

2. The method of claim 1, wherein the step of measuring signal power in the first predetermined frequency band comprises the steps of:

filtering the received test signal to form a first filtered signal; and measuring signal power of the first filtered signal.

3. The method of claim 1, wherein the step of measuring signal power in the second predetermined frequency band comprises the steps of:

filtering the received test signal to form a second filtered signal; and measuring signal power of the second filtered signal.

4. The method of claim 1, wherein the step of comparing the measured signal powers to determine the presence or absence of load coils comprises the steps of:

comparing the measured signal power in the first and second predetermined frequency bands to form a difference signal; and determining the presence or absence of load coils based on the difference signal.

5. The method of claim 4, wherein the step of comparing the measured signal powers comprises the steps of:

scaling the second filtered signal power to form a sled signal power; and comparing the signal power in the first predetermined frequency band and the scaled signal power to form the difference signal.

6. A receiver for receiver data over a loaded or unloaded twisted pair, comprising:

a load coil detection circuit for receiving a test signal transmitted by a transmitter and determining whether or not load coils are connected to the twisted pair based on the received test signal, the load coil detection circuit comprising a signal power measuring circuit for measuring signal power of the received signal in first and second predetermined frequency bands and a comparator circuit for comparing the measured signal powers to determine the presence or absence of load coils; and an adjustment circuit in communication with the load coil detection circuit for adjusting the receiver to compensate for the presence or absence of load coils connected to the twisted pair.

7. The receiver of claim 6, wherein the signal power measuring circuit includes:

a first filtering circuit for filtering the received test signal to form a first filtered signal; and a second filtering circuit for filtering the received test signal to form a second filtered signal.

8. A method of using a transmitter to transmit data over a twisted pair with or without load coils, comprising the steps of:

generating a test signal using a transmitter by generating a first signal having signal power concentrated in a first predetermined frequency band, generating a second signal having signal power concentrated in a second predetermined frequency band, and combining the first and second signals to form the test signal;

transmitting the test signal over the twisted pair to a receiver, and transmitting data over the twisted pair to the receiver using the transmitter.

9. A method of using a transmitter to transmit data over a twisted pair with or without load coil, comprising the steps of:

generating a test signal using a transmitter by generating a first signal having a first frequency in a first predetermined frequency band, generating a second signal having a second frequency in a second predetermined frequency band, and combining the first and second signals to form the test signal;

transmitting the test signal over the twisted pair to a receiver; and transmitting data over the twisted pair to the receiver using the transmitter.

10. A transmitter for transmitting data over a twisted pair with or without load coils, comprising:

a signal generating circuit for generating and transmitting a test signal over the twisted pair, the signal generating circuit including a first signal generator for generating a first signal having a first frequency in a first predetermined frequency band, a second signal generator for generating a second signal having a second frequency in a second predetermined frequency band, and a summing circuit for combining the first and second signals to form the teat signal; and wherein the transmitter is further operable to transmit data over the twisted pair.

11. A method of transmitting data over a twisted pair connected between a first transceiver and a second transceiver, comprising the steps of:

generating a test signal using the first transceiver by generating a first signal having signal power concentrated in a first predetermined frequency band, generating a second signal having signal power concentrated in a second predetermined frequency band, and combining the first and second signals to form the test signal;

transmitting the test signal over the twisted pair to the second transceiver;

determining whether or not load coils are connected to the twisted pair based on the test signal using a load coil detection circuit in the second transceiver;

adjusting the second transceiver to compensate for the presence or absence of load coils on the twisted pair using an adjustment circuit in the transceiver; and transmitting data from the first transceiver to the second transceiver.

12. A method of transmitting data over a twisted pair connected between a first transceiver and a second transceiver, comprising the steps of:

generating a test signal using the first transceiver;

transmitting the test signal over the twisted pair to the second transceiver;

determining whether or not load coils are connected to the twisted pair based of the test signal using a load coil detection circuit in the second transceiver by measuring signal power of the test signal in a first predetermined frequency band, measuring signal power of the test signal in a second predetermined frequency band, and comparing the measured signal powers to determine the presence or absence of load coils;

adjusting the second transceiver to compensate for the presence or absence of load coils the twisted pair using an adjustment circuit in the transceiver; and transmitting data from the first transceiver to the second transceiver.

13. The method of claim 12, wherein the step of measuring signal power in the first predetermined frequency band comprises the steps of:

filtering the test signal to form a first filtered signal; and measuring signal power of the first filtered signal.

14. The method of claim 12, wherein the step of measuring signal power in the second predetermined frequency band comprises the steps of:

filtering the test signal to form a second filtered signal; and measuring signal power of the second filtered signal.

15. The method of claim 12, wherein the step of comparing the measured signal powers to determine the presence or absence of load coils comprises the steps of:

comparing the measured signal power in the first and second predetermined frequency bands to form a difference signal; and determining the presence or absence of load coils based on the difference signal.

16. The method of claim 15, wherein the step of comparing the measured signal powers comprises the step of:

scaling the second filtered signal power to form a scaled signal power; and comparing the signal power in the first predetermined frequency band and the scaled signal power to form the difference signal.

17. A system for transmitting data across a twisted pair comprising:

a first transceiver for generating and transmitting a test signal across the twisted pair, the first transceiver further operable to receive and transmit data across the twisted pair, the first transceiver including a first signal generator for generating a first signal having a first frequency in a first predetermined frequency band, a second signal generator for generating a second signal having a second frequency in a second predetermined frequency band, and a summing circuit for combining the first and second signal to form the test signal;

a second transceiver connected to the first transceiver using the twisted pair for receiving the test signal from the first transceiver, the second transceiver further operable to receive data transmitted by the first transceiver:

a load coil detection circuit in the second transceiver for determining whether or not load coils are connected to the twisted pair using the test signal received from the first transceiver; and an adjustment circuit in the second transceiver for adjusting the second transceiver to compensate for the presence or absence of load coils on the twisted pair.

18. A system for transmitting data across a twisted pair, comprising:

a first transceiver for generating and transmitting a test signal across the twisted pair, the first transceiver further operable to receive and transmit data across the twisted pair;

a second transceiver connected to the first transceiver using the twisted pair for receiving the test signal from the first transceiver, the second transceiver further operable to receive data transmitted by the first transceiver;

a load coil detection circuit in the second transceiver for determining whether or not load coils are connected to the twisted pair using the test signal received from the first transceiver, the load coil detection circuit comprising a signal power measuring circuit for measuring signal power of the received signal in first and second predetermined frequency bands, and a comparator circuit for comparing the measured signal powers to determine the presence or absence of load coils; and an adjustment circuit in the second transceiver for adjusting the second transceiver to compensate for the presence or absence of load coils on the twisted pair.

19. The system of claim 18, wherein the signal power measuring circuit includes:

a first filtering circuit for filtering the test signal to form a first filtered signal; and a second filtering circuit for filtering the test signal to form a second filtered signal.

20. A system for transmitting data across a twisted pair, comprising:

a first transceiver for generating and transmitting a test signal across the twisted pair, the first transceiver further operable to receive and transmit data across the twisted pair;

a second transceiver connected to the first transceiver using the twisted pair for receiving the test signal from the first transceiver, the second transceiver further operable to receive date transmitted by the first transceiver;

a load coil detection circuit in the second transceiver for determining whether or not load coils are connected to the twisted pair using the test signal received from the first transceiver, the load coil detection circuit operable to determine whether or not load coils are connected to the twisted pair by calculating the ratio of the power of the received signal outside of the voice frequency band and the power of the received signal inside the voice frequency band and comparing this ratio to a predetermined constant; and an adjustment circuit in the second transceiver for adjusting the second transceiver to compensate for the presence or absence of load coils on the twisted pair.

* * * * *